(12) United States Patent   (10) Patent No.: US 12,190,664 B2
Mondrow et al.                  (45) Date of Patent: Jan. 7, 2025

(54) INTELLIGENT LOCK

(71) Applicant: KoreLock. Inc., Englewood, CO (US)

(72) Inventors: Nolan Mondrow, Englewood, CO (US); Robert Goff, Golden, CO (US); Ewe Chye Tan, Denver, CO (US)

(73) Assignee: Korelock, Inc., Englewood, CO (US)

( * ) Notice: Subject to any disclaimer, the term of this patent is extended or adjusted under 35 U.S.C. 154(b) by 0 days.

(21) Appl. No.: 18/244,122

(22) Filed: Sep. 8, 2023

(65) Prior Publication Data

US 2023/0419753 A1    Dec. 28, 2023

Related U.S. Application Data

(63) Continuation of application No. 18/049,137, filed on Oct. 24, 2022, now Pat. No. 11,854,324, which is a continuation of application No. 16/902,965, filed on Jun. 16, 2020, now Pat. No. 11,482,063, and a continuation of application No. 16/446,002, filed on
(Continued)

(51) Int. Cl.
  *G07C 9/00* (2020.01)
  *H04W 52/02* (2009.01)

(52) U.S. Cl.
  CPC ..... *G07C 9/00309* (2013.01); *G07C 9/00571* (2013.01); *G07C 9/00857* (2013.01); *H04W 52/0248* (2013.01); *G07C 2009/00365* (2013.01); *G07C 2009/00428* (2013.01); *G07C 2009/00865* (2013.01); *G07C 2009/00888* (2013.01); *G07C 9/00904* (2013.01)

(58) Field of Classification Search
  CPC ............ G07C 9/00309; G07C 9/00571; G07C 9/00857; G07C 9/00904; G07C 2009/00428; G07C 2009/00865; G07C 2009/00365; G07C 2009/00825; G07C 2209/08; G07C 2009/00793; H04W 52/0248; Y02D 30/70; G06Q 10/06; G06Q 10/10; G06Q 50/16; G06F 11/00
  USPC .................................. 340/5.61, 5.6
  See application file for complete search history.

(56) References Cited

U.S. PATENT DOCUMENTS 6,876,293 B2 *  4/2005  Frolov ................. G07C 9/0069
                                                340/542
7,098,772 B2 *  8/2006  Cohen .................... G08C 17/02
                                                340/10.52
(Continued)

FOREIGN PATENT DOCUMENTS

WO    WO-2014051632 A1 *  4/2014  .............. F24F 11/30

*Primary Examiner* — Nam V Nguyen
(74) *Attorney, Agent, or Firm* — Holland & Hart LLP

(57) ABSTRACT

A method for operating an access control comprises creating a plurality of wake-up schedules for a wireless transceiver. Each of the plurality of wake-up schedules may be configured to control how frequently the wireless transceiver wakes up to transmit or receive information. Each of the plurality of wake-up schedules for the wireless transceiver may be different from another one or the plurality of wake-up schedules for the wireless transceiver. The method may further comprise automatically switching between the plurality of wake-up schedules for the wireless transceiver such that a duration of time between wake-ups for the wireless transceiver radio is shorter during some predefined times and longer during other predefined times. The duration of time between wake-ups for the wireless transceiver may be configurable by an administrative user via an interface.

10 Claims, 8 Drawing Sheets

Related U.S. Application Data

Jun. 19, 2019, now Pat. No. 10,699,500, and a continuation of application No. 16/057,654, filed on Aug. 7, 2018, now Pat. No. 10,366,556.

(56) References Cited

U.S. PATENT DOCUMENTS

| | | | | |
|---|---|---|---|---|
| 8,630,741 | B1 * | 1/2014 | Matsuoka | F24F 11/88 |
| | | | | 700/12 |
| 9,460,480 | B2 * | 10/2016 | Woodard | G07F 9/002 |
| 9,600,949 | B2 * | 3/2017 | Conrad | H04W 12/06 |
| 9,648,564 | B1 * | 5/2017 | Cui | H04W 52/0222 |
| 10,366,556 | B1 * | 7/2019 | Mondrow | G07C 9/00309 |
| 10,699,500 | B2 * | 6/2020 | Mondrow | H04W 52/0248 |
| 10,904,829 | B2 * | 1/2021 | Kneckt | H04W 52/0216 |
| 11,482,063 | B2 * | 10/2022 | Mondrow | G07C 9/00309 |
| 11,854,324 | B2 * | 12/2023 | Mondrow | G07C 9/00857 |
| 2002/0146985 | A1 * | 10/2002 | Naden | H04W 52/0248 |
| | | | | 455/67.11 |
| 2016/0219510 | A1 * | 7/2016 | Asterjadhi | H04W 52/0274 |
| 2016/0291966 | A1 * | 10/2016 | Johnson | G07C 9/00174 |
| 2017/0195962 | A1 * | 7/2017 | Naftali | H04W 52/0229 |
| 2018/0132178 | A1 * | 5/2018 | Park | H04W 52/0216 |
| 2018/0191742 | A1 * | 7/2018 | Dawes | H04L 63/08 |

* cited by examiner

600

SETTINGS ⑦

Serial Number
AC000W001494369

601 — Name
Lafayette Front Door

602 — Programming Code
9179

603 — Wake WiFi ⑦
On any user action (e.g. keypress)

613

604 — ⬤▶ Mute ⑦

605 — Heartbeat Interval ⑦
12 hours

615

606 — Auto-lock
○ Enable
⦿ Disable
○ Schedule

607 — Lock action schedule ⑦
Daily Lockup 8am/9pm

617

SAVE

*FIG. 6*

INTELLIGENT LOCK

CROSS-REFERENCE TO RELATED APPLICATIONS

This application is a continuation of U.S. patent application Ser. No. 18/049,137, filed Oct. 24, 2022 and entitled "INTELLIGENT LOCK," pending, which is a continuation of U.S. patent application Ser. No. 16/902,965, filed Jun. 16, 2020 and entitled "INTELLIGENT LOCK," and issued as U.S. Pat. No. 11,482,063 on Oct. 25, 2022, which is a continuation of U.S. patent application Ser. No. 16/446,002, filed Jun. 19, 2019 entitled "INTELLIGENT LOCK" and issued as U.S. Pat. No. 10,699,500 on Jun. 30, 2020, which is a continuation of U.S. patent application Ser. No. 16/057,654, filed Aug. 7, 2018 entitled "INTELLIGENT LOCK" and issued as U.S. Pat. No. 10,366,556 on Jul. 30, 2019, the entire disclosures of which are hereby incorporated by reference for all proper purposes.

FIELD OF THE DISCLOSURE

The present disclosure relates generally to intelligent, internet connected door locks. In particular, but not by way of limitation, the present disclosure relates to systems, methods and apparatuses for improving transmission reliability and battery life of such internet connected door locks.

BACKGROUND

Access control systems electronically control the locking and unlocking of doors including those for buildings, office suites, residences, rental units and retail establishments. These systems typically use some type of "credentialing" method such as pressing RFID cards to a reader, inserting magnetic cards into a slot (e.g., in hotel door locks), or entering PIN codes on a keypad to identify people who are allowed to enter. In order to grant access to people for multiple doors in a building or across multiple buildings, the selected credentialing method has to be synchronized with the lock/device at each door. There are three primary types of credentialing systems: wired systems, standalone systems, and standalone door locks. Each of these existing types of credentialing systems create various challenges in terms of expense, ease of installation, ease of use, connectivity, and security. Therefore, a need exists for improved access control systems that remedy these deficiencies.

SUMMARY

An aspect of the present disclosure provides a method for operating an access control device having a battery, a processor, and one or more wireless transceivers. The method may comprise creating a plurality of wake-up schedules for each of the one or more wireless transceivers. Each of the plurality of wake-up schedules may be configured to control how frequently a particular wireless transceiver wakes up to transmit or receive information. Each of the plurality of wake-up schedules for the particular wireless transceiver may be different from another one or the plurality of wake-up schedules for the particular wireless transceiver. The method may further comprise automatically switching between the plurality of wake-up schedules for the particular wireless transceiver such that a duration of time between wake-ups for the particular wireless transceiver radio is shorter during some predefined times and longer during other predefined times. The duration of time between wake-ups for each of the plurality of wake-up schedules for each of the one or more of the wireless transceivers may be configurable by an administrative user via an interface.

Another aspect of the disclosure provides an access control device which may comprise a battery, a processor, a locking mechanism, a credential acceptance mechanism, and one or more wireless transceivers configured to transmit or receive data from the access control device. The access control device may be configured to create a plurality of wake-up schedules for each of the one or more wireless transceivers. Each of the plurality of wake-up schedules may be configured to control how frequently a particular wireless transceiver wakes up to transmit or receive information. Each of the plurality of wake-up schedules for the particular wireless transceiver may be different from another one or the plurality of wake-up schedules for the particular wireless transceiver. The access control device may be further configured to automatically switch between the plurality of wake-up schedules for the particular wireless transceiver such that a duration of time between wake-ups for the particular wireless transceiver is shorter during some predefined times and longer during other predefined times. The duration of time between wake-ups for each of the plurality of wake-up schedules for each of the one or more of the wireless transceivers are configurable by an administrative user via an interface.

BRIEF DESCRIPTION OF THE DRAWINGS

FIG. 6 is an exemplary graphical user interface through which an administrative user may configure settings of a lock according to the present disclosure.

DETAILED DESCRIPTION

Figure 1:
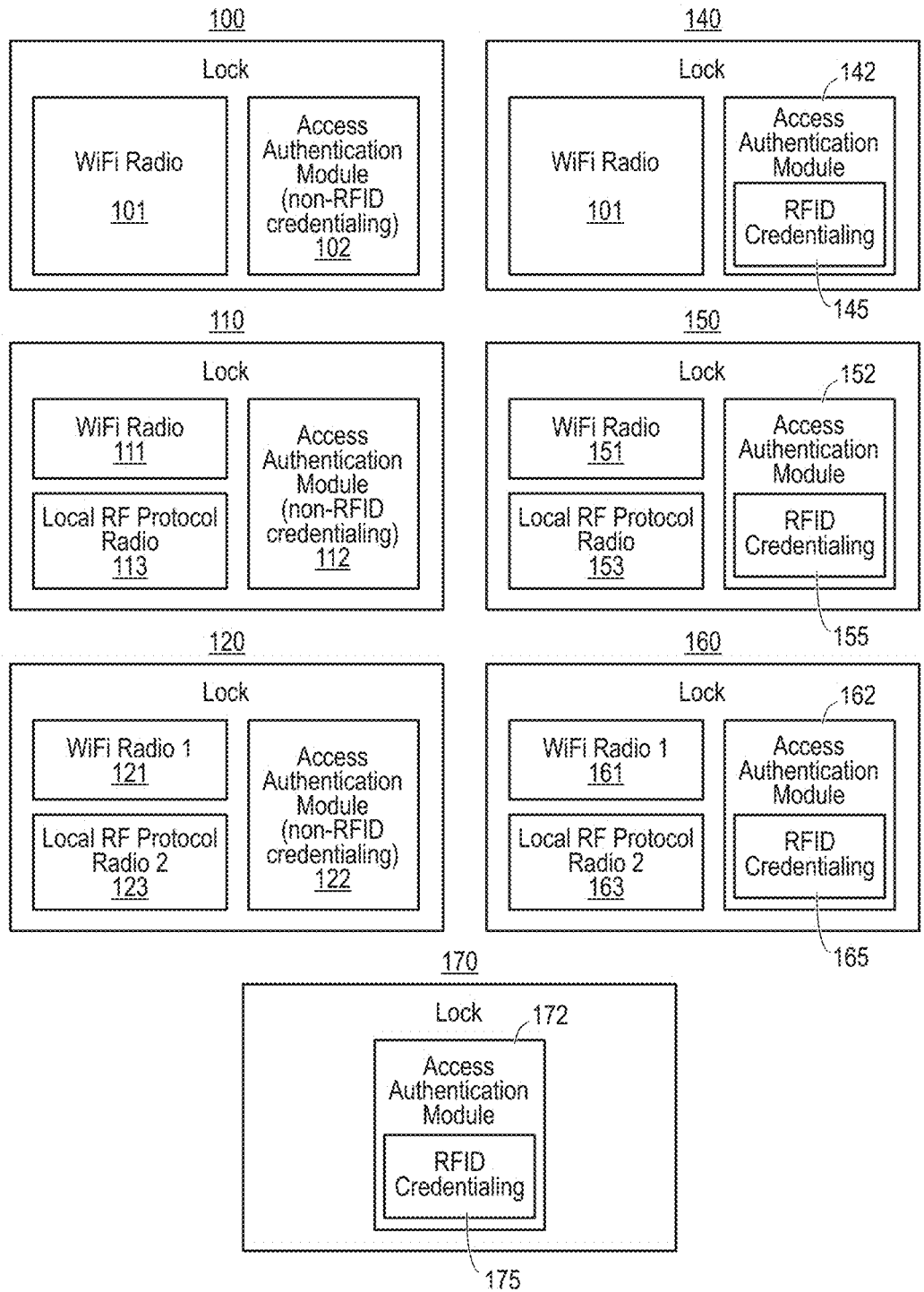
FIG. 1 depicts logical block diagrams of several embodiments of intelligent locks according to the present disclosure.

The word "exemplary" is used herein to mean "serving as an example, instance, or illustration." Any embodiment described herein as "exemplary" is not necessarily to be construed as preferred or advantageous over other embodiments.

Existing wired access control systems typically require electrical cables to be pulled to each door from a central control panel in order to control locking/unlocking doors and to control credentialing mechanisms (e.g., through a card reader or PIN keypad). The control panel is then wired to a computer that runs software to manage users. The primary elements of this kind of system are (1) a central computer software, (2) a door controller(s), (3) a door locking/unlocking device (electric strike, magnetic lock, etc.), and (4) a credentialing mechanism (card reader, keypad, etc.).

Throughout the disclosure, the term "administrative user" may be used to refer to an individual or set of authorized individuals who own locks or otherwise have permission to change settings of one or more locks. The term "access user" may be used to refer to an individual or set of individuals who attempt to gain access to a locked area via entering a code into, or presenting a credential to, a lock of the present disclosure.

Existing standalone systems are similar to wired systems except they only control a single door and are not part of a centralized system. The primary elements of this kind of system are (1) a door controller, (2) a door locking/unlocking device (electric strike, magnetic lock, etc.), (3) a credentialing mechanism (card reader, keypad, etc.), and sometimes (4) a non-connected computer running software to manage access users. In the case that software is used, the access user information is transferred from the software to the system using some type of plugin cable or reader (e.g. a USB cable, PDA device, etc.).

Existing standalone door locks are single unit door locks with either a keypad, card reader, or other credentialing system built into the lock. These units are comprised of a controller, locking/unlocking device, and credentialing system all-in-one. Sometimes a non-connected computer running software to manage access users is used. In this case as well, the access user information may be transferred from the software to the door lock using some type of plugin cable or reader (e.g. a USB cable, PDA device, etc.).

There are four main categories of problems that must be addressed in any large-scale access control system, which are problems related to 1) remote doors, 2) onsite maintenance needs, 3) managing multiple locks in a single system, and 4) creating an API that can access multiple lock types.

Regarding the "remote door" category of problems, each of these problems stems from the fact that in certain building environments, there are large numbers of doors in remote locations. These doors can be difficult and expensive to connect via cable to the centrally located door controllers and computer systems. To address this difficulty in the industry, some door lock companies and system manufacturers have developed wireless communication capabilities that allow a standalone door lock to communicate with central computer software via a local protocol wireless network. The elements of this solution may include (a) local protocol RF transceivers with a proprietary or industry standard non-WiFi radio frequency (Z-Wave, Zigbee, or Bluetooth) installed in both the door locks and in/on the system door controller and (b) multiple additional gateways that communicate with the door locks through the proprietary or industry-standard frequency, and by which each gateway then communicates through a WiFi router to the Internet.

These types of RF transceiver systems themselves present three main problems: First, these types of local networks are very complicated to set up and often require a certified installer. Such installers are scarce and expensive. Second, the door locks themselves are very expensive. Third, because of the proprietary or standard RF protocols, the door lock receiver has to be integrated at the factory level to work with each access control system requiring a one-to-one software development effort between the lock manufacturer and every system manufacturer.

The multiple gateways required by these systems also present additional problems. For example, such systems may require that a large number of them be installed to sufficiently reach the locks with the proprietary or standard RF networks given their transmission range limitations. Customers have to pay extra for these additional gateways, and installation is expensive. Often, these factors result in installers repeatedly trying to reposition gateways to find optimal coverage.

Regarding the "onsite maintenance category of problems, existing access control systems often require expensive hardware and software to be purchased and maintained onsite in every building in order to manage users. Additionally, system managers must physically go to the site in order to manage any additions/deletions of access users and to perform system maintenance. To solve this problem, some manufacturers have developed true cloud-based systems which run all the software in the cloud, which eliminates the need for an access control system computer at each site. Other companies have used VPNs and other networking capabilities to remotely access the onsite servers.

However, this type of cloud-based solution presents new challenges of its own. Namely, VPN solutions are complex and require a skilled IT staff, and local servers with access control software require onsite visits for maintenance.

Regarding the "multiple lock types" category of problems, this refers to the fact that different types of doors may be locked by electric strike, magnetic lock, or any other variety of electrically and/or magnetically powered physical locks available in the industry. Different locks can have different power requirements, wiring requirements, and failsafe requirements. Further, different locks can have different credentialing methods, different capabilities to store access user credentials, different lock mode settings (e.g. passage mode, storehouse mode, classroom mode, etc.) and different communication methods and frequencies (e.g. a WiFi lock pulses or sends information transmission "heartbeats" while Z-wave locks are always on and connected). All of these differences must be accounted for by whatever type of overall management system is in place. For purposes of the present disclosure, the term "heartbeats" will be used to describe particular types of wireless information transmissions that have the characteristics of being sent at regular and/or periodic intervals, and which comprise similar or identical types of information in each transmission.

Regarding the "API for multiple lock types" category of problems, this refers to the fact that both the firmware that may be used on a local door lock, reader, or controller ("Lock Controlling Device") and the software that may be used for central access control management ("Access Software") must often need to provide an application program interface that allows different vendors of different Lock Controlling Device types to integrate with different vendors of different Access Software. This can be difficult because each integration between a Lock Controlling Device and its Access Software requires a one-to-one integration for the Access Software to be able to control and manage the functions that are specific and often unique to each Lock Controlling Device. The time and expense required to complete each of these integrations results in a limited set of Lock Controlling Devices that each Access Software can control. There is no single universal translator that can interpret the commands required to control most Lock Controlling Devices in a single consolidated API.

Aspects of the present disclosure provide systems, methods, and apparatuses for addressing the access control challenges previously described. Embodiments may include door locks that are both directly cloud-controlled via WiFi and locally RF connected and integrated with access control systems. Though other internet-connected door locks exist, most typically use the proprietary or standard local RF protocols (previously described) to then connect, via a gateway for the protocol, to the internet via a local wired or wireless router. For the purposes of clarity in the present disclosure, the term "local RF protocol" will be used to refer to a proprietary or standard (e.g., BLE, ZigBee, Z-Wave) RF protocol that is used to communicate within a local area network (LAN), mesh network, or other network in a local building environment, rather than over a Wide Area Network (WAN) or cellular data network. These local RF protocols may also be referred to as "short-range RF protocols." The term WiFi will be used to refer to wireless internet transmission protocols over a WAN. Though WiFi is technically a radio frequency (RF) protocol, for purposes of clarity in this disclosure, it will not be referred to as an RF protocol, and will rather be referred to specifically as WiFi.

Using one of these local RF protocols requires the premises to have both the physical local protocol gateway (usually many of them) as well as the wired or wireless internet router. Many types of building premises (e.g., hotels, office buildings) already have many wired or wireless internet routers to provide internet access to their occupants, so it is advantageous to simply utilize this existing hardware instead of installing additional local gateway hardware. Some Wi-Fi connected locks which utilize existing routers do exist, but a main challenge to widespread implementation of these locks is that battery life is short because of the high-power requirements of WiFi transmission as compared to local RF protocol. Remote door locks that have only local RF protocol radios use less battery power, but their transmission capability is less powerful than that of a WiFi radio and require precise positioning of gateways as described above. During peak transmission times, the lower power transmission capability can result in failed data transmissions. Therefore, WiFi-alone door locks and local RF protocol-alone door locks both have limitations.

Locks according to the present disclosure may obtain access user credentials in several different ways. In some embodiments, the lock may comprise a numerical or alphanumerical keypad or touchscreen interface. In some embodiments, the lock may comprise an RFID reader, BLE reader, magnetic stripe, and/or near-field communication (NFC) reader. These may accept credentials that are stored in a key card, fob, smartphone, or other physical device via radio frequency transmission over a very short range (e.g., less than 6 inches away from the reader) In some embodiments, a single lock may comprise multiple or all of these types of credential acceptance mechanisms. The RFID, BLE, and NFC readers all operate via a type of radio-frequency communication, but to distinguish the reader "credential acceptance" functionality from the local RF protocol radio transmissions that are sent to the cloud server, the RFID, BLE, and NFC credential acceptance functionality will be referred to throughout the disclosure as "RF credentialing."

Locks in accordance with present disclosure may comprise one or more types of wireless transceivers. For the purposes of the present disclosure, a wireless transceiver may refer to any device that transmits and/or receives data wirelessly. Certain types of wireless transceivers may be referred to specifically as radios, while others may be referred to as credentialing mechanisms and/or devices. Locks according to the present disclosure may comprise a single type of radio, or combinations of multiple types of radios. For example, an embodiment may comprise a WiFi radio only. Another embodiment may comprise both a WiFi radio and BLE radio. Another may comprise a BLE radio and another local RF protocol but no WiFi radio. For example, they may comprise a BLE radio and a Zigbee or Zwave radio. Each of these embodiments (WiFi only, WiFi plus BLE, BLE plus Zigbee or Zwave) may implement one or more access user authorization methods.

These access user authorization methods may include physical or touchscreen keypad code entry that is verified either by remote server authentication, local Lock Controlling Device authentication or local algorithm authentication. Remote server authentication of a code entry refers to a system wherein an owner of the lock sets a numeric or alphanumeric code on a remote server, and when a user enters the code on the physical lock, the lock communicates wirelessly with the server to verify if the code matches and access is authorized. Local Lock Controlling Device authentication of a code entry refers to a system wherein an owner of the lock sets a numeric or alphanumeric code on a remote server, the remote server instantly (or shortly thereafter) sends the code to a Lock Controlling Device and when a user enters the code on the physical lock, the Lock Controlling Device checks the code entered by the user to verify if the code matches that previously received from the remote server and access is authorized. Local algorithm authentication refers to a system wherein an administrative user of a lock receives a numeric or alphanumeric code generated by an algorithm based on a serial number of the lock (e.g., on paper or via an online system of the manufacturer), and when an access user enters the code, the algorithm is performed locally at the lock, without communicating wirelessly to any server.

Other kinds of access user authorization methods may be used instead of or in conjunction with the remote server authentication or local algorithm authentication previously described. For example, authentication via a magnetic stripe key card may be used. Wireless transceiver credentialing mechanisms, such as an RFID or near-field communication (NFC) device, in which authentication information is wirelessly transmitted through a short-range wireless protocol implemented on a physical authentication device, may be used. These types of physical authentication devices typically comprise an NFC transceiver and transmit information when in very close proximity—i.e., a few centimeters or less-of another NFC transceiver, and may include key fobs, cards, wearable devices, or smartphones, for example. They may also comprise capacitive proximity sensors and targets.

Several embodiments of a remote door lock may be implemented according to the present disclosure. FIG. 1 shows logical block diagrams of various embodiments. Lock 100 may comprise a WiFi radio 101 and an access authentication module 102. As shown, the access authentication module 102 is non-RFID credentialing, meaning it may authenticate access by other methods previously mentioned (e.g., keypad, algorithm, etc.). Lock 110 may comprise both a WiFi radio 111, one or more local RF protocol radios 113, and an access authentication module (non-RFID credentialing) 112. Lock 120 may comprise no WiFi radios, but may have two or more types of local RF protocol radios, including local RF protocol radio 1 123 and local RF protocol radio 2 124, and an access authentication module 122.

Another embodiment is shown as lock 140, which may comprise a WiFi radio 141 and an access authentication module 142. The access authentication module 142 may comprise non-RFID credentialing methods but may also comprise an RFID credentialing module 145. The RFID credentialing module 145 may be implemented by BLE or another type of NFC (i.e., a wireless transceiver). Lock 150 may comprise a WiFi radio 151, a local RF protocol radio 153, access authentication module 152, and RFID credentialing module 155. In some embodiments, BLE may be used to implement both the local RF protocol radio 153 as well as the RFID credentialing module. For example, BLE may be used to both connect the lock to the internet and to read a credential. Lock 160 may comprise a plurality of local RF protocol radios 163, 164, an access authentication module 162, and RFID credentialing module 165. The plurality of local RF protocol radios may be implemented by, for example, a Zigbee radio and a BLE radio, and in some embodiments the Zigbee radio may be used to connect the lock to the internet and the BLE radio may be primarily used to implement the RFID credentialing module 165 to read a credential. In such embodiments, the BLE radio may be used as a backup to connect to the internet if the Zigbee radio cannot connect and a gateway exists on site that can use BLE to communicate with the lock and WiFi to communicate with the internet. Lock 170 may have no network connectivity but may comprise an access authentication module 172 and an RFID credentialing module 175. which may be implemented by BLE or another NFC transceiver.

One aspect of the disclosure is that any of the WiFi and local RF protocol radios and associated processors may be in either a "sleep" (i.e., low-to-no power requirement) mode or an "awake" (i.e., functional) mode at given times in order to save power and maximize transmission power. In general, the WiFi radio may consume more battery power when it is awake, may transmit more frequently, and its data transmissions may be more reliable than those of the local RF protocol radio. Several kinds of data transmissions take place between remote door locks and the server that controls them, such as the cloud servers in embodiments of the present disclosure. The cloud servers may host an application, referred to herein as a "cloud service," that transmits and receives information via the internet to and from the locks and to and from administrative users. The cloud service may provide one or more interfaces for administrative users to access and change information and settings of their locks. A number of factors may determine what information gets transmitted to and from the locks and the cloud service, which will be described further in this disclosure. Data transmitted between locks and the cloud service may be referred to simply as "transmissions." Some of the transmissions may include the previously described "heartbeat" transmissions, and may comprise information such as battery status, number and times of entries, and other lock health information.

In certain circumstances, such as high transmission volume time periods (also referred to herein as "peak times"), it may be preferable to utilize the WiFi radio over the local RF protocol radio to ensure that transmission takes place. For example, if an administrator user has changed an access permission (e.g., changed a keypad code or activated/deactivated a card) at the server, that kind of transmission is very high-priority, and would most beneficially be transmitted over WiFi during those peak times to ensure that the lock receives the correct credential identifying information. Or, if tampering has been detected at a lock, or a failure of the lock's battery is imminent, the transmission of such information may also be high-priority. Peak times in an office building may include the beginning and ending of work hours or shifts, and peak times in a hotel may include check in, check out, and early evening times, for example.

However, during non-peak times, and/or for less critical information transmission (including heartbeats), it may be advantageous to use the local RF protocol radio to save battery power. The local RF protocol radio may itself have sleep and awake modes, and in its awake modes may transmit information such as status data (i.e., a response to an inquiry from the cloud server about a status of the lock), battery information, number of access requests, connectivity issues, time-delayed data, or other information that is considered less time-sensitive and/or critical than high-priority information. Therefore, the lock may save battery power by allowing both the WiFi radio and local RF protocol radio to be asleep at the same time or may save battery power by only waking up the local RF protocol radio and not the WiFi radio for certain transmissions.

Another aspect of the disclosure is that one or more of the WiFi radio and local RF protocol radio may transmit data at varying signal strengths to save battery power. Each radio may transmit at higher or lower power as measured in dBm (decibel-milliwatts), and different levels of such power may be advantageous in different environments. In embodiments of the disclosure, an algorithm may be used to configure an optimum signal strength for a particular lock to connect to a router or gateway that maximizes reliability and battery power. For example, the lock may check whether connectivity is reliable at its maximum signal strength and then check at lower signal strengths to find the lowest possible signal strength that reliably connects to the router or gateway. It is contemplated that in embodiments, this signal strength could be adjusted periodically and/or dynamically. For example, the lock could be set to check every few weeks whether a higher lower signal strength would be optimal, or it could automatically check when any network connectivity problems were detected. For example, if a new piece of furniture were to be placed between a router or gateway and the lock, resulting in network connectivity problems, the lock could automatically re-run the signal strength optimization algorithm to increase signal strength.

It is contemplated that the act of a user presenting a credential, either via punching in a code on a keypad, RF credentialing, or any other method, will wake-up either the local RF protocol radio, the WiFi radio, or both, at any time. RF credentialing can operate either by continuously "polling" for a user authentication signal by sending out low-power transmissions that may identify an RF credential device or by capacitive proximity sensors that sense "target" objects due to the target's ability to be electrically charged. This type of RF credentialing may be implemented by BLE or another NFC protocol. The RF credentialing polling function, in many embodiments, may not itself enter sleep states, because any time a user presents a credential, it is important that the lock recognize it. The RF credentialing function may not require very much power compared to the RF and/or WiFi transmissions. However, it is contemplated that the frequency of RF credential polling may still be lowered during non-peak times to save power. For example, polling frequencies may be reduced to once per second (or lower) instead of 10 times per second. Therefore, the RF credentialing polling function may be always on, and the presenting of the credential itself may serve to wake-up the local RF protocol radio and/or WiFi radio.

The present disclosure provides systems and methods for determining when and how any of the WiFi and/or local RF protocol radios sleep and wake. One aspect of the present disclosure is that the time and manner in which the local RF protocol radio and the WiFi radio will wake-up may be configured by an administrator user of a lock or an entire access control system. This feature may be referred to herein as "user configurability" or "user configuration." It is contemplated that prior to any user configuration, default radio wakeup schedules may be hard-coded into the firmware of each lock by the lock manufacturer. These wakeup schedules may include sets of time periods during which the lock is set to wake-up at particular intervals. For example, a lock may have default settings including a nighttime schedule, a daytime schedule, a weekend and weekday schedule, and a holiday schedule. For an office building in which most access occurs during weekday, daytime hours, a user (i.e., administrator of the building's door lock system) may configure particular changes to the default sleep/wake schedule.

The lock itself may automatically switch between the wakeup schedules on each of the transceivers and/or radios. These automatic switches may take place based on the time of day, day of the week, battery life, or any other factor or settings. The administrative user may wish to configure these settings and/or changes based on personal knowledge of actual lock use at various times. Each wake-up schedule itself may be changed, either automatically and/or by an administrative user, in order to change a duration of time between wake-ups of a particular radio. The administrative user may configure the daytime, weekday schedules such that may wake-up the local RF protocol radio every hour and configure the nighttime and weekend schedules to wake-up the local RF protocol radio every 4, 8 or 12 hours. The user may configure these schedules in a number of ways. In embodiments, the user may configure the schedule via a graphical user interface on a computing device remote from the lock via the cloud service. In embodiments, a user may configure these settings at the lock itself. In some embodiments, a user may configure these sleep/wake settings via an internet-connected voice-activated digital assistant, as will be described in more detail later in this disclosure.

Figure 2:
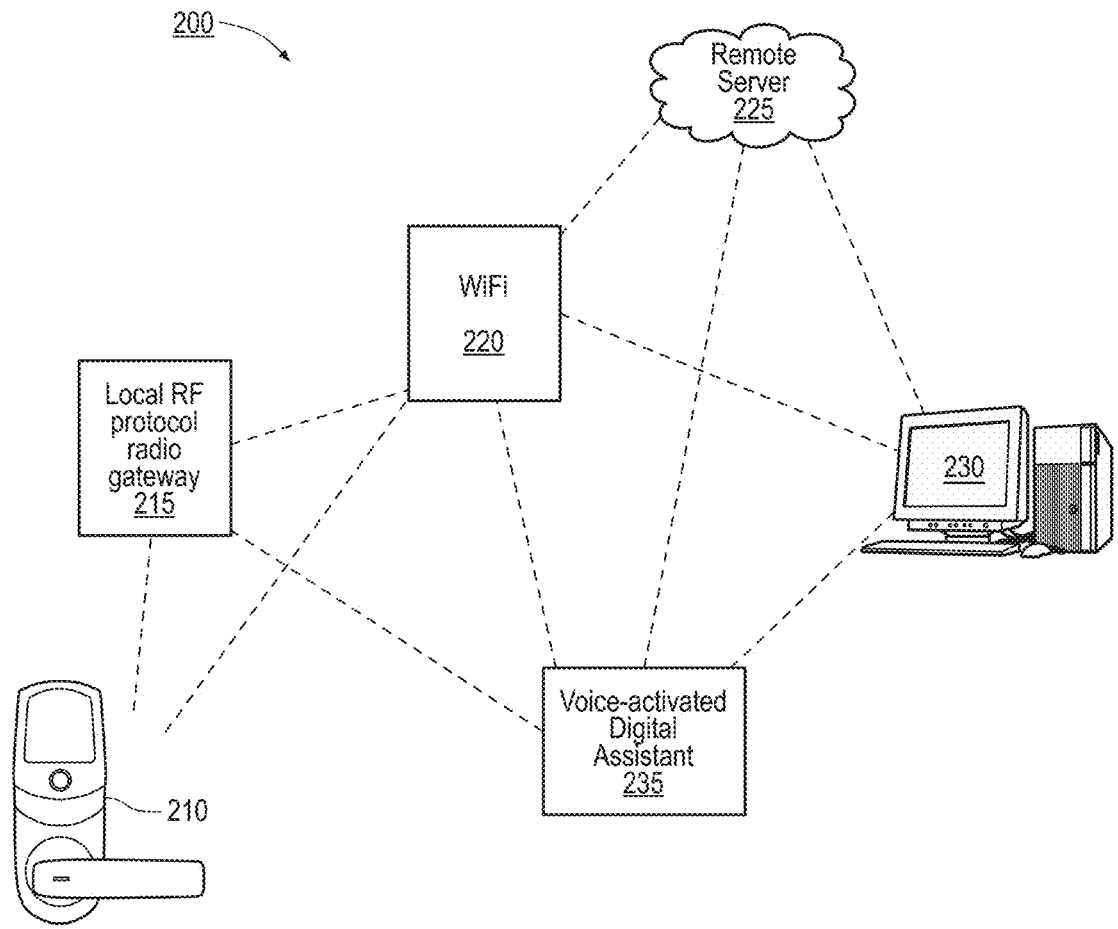
FIG. 2 is a logical network diagram showing a lock and a plurality of network components to which the lock may be directly or indirectly connected.

FIG. 2 shows a network diagram 200 of a lock 210 and various network elements to which it may be connected. In embodiments wherein the lock 210 comprises a local RF protocol radio, the lock 210 may connect to a local RF protocol gateway 215, which in turn may connect to a WiFi router 220. In embodiments wherein the lock 210 comprises a WiFi radio, the lock 210 may directly connect to the WiFi router 220 instead of or as an alternative to connecting to the local RF protocol gateway. The WiFi router 220 may then connect to the remote server 225 to transmit information sent from the lock 210. The remote server 225 may connect to an administrative user computing device 230 to send and receive information. The remote server 225 may store information transmitted from the lock 210 and present it at the computing device 230 to allow the administrative user to view the information and control various settings of the lock, such as lock access codes and credentials, and sleep and wake schedules. In some embodiments, the computing device 230 may be within a same LAN as the WiFi and in others it may be remote, which allows administrative users anywhere to configure lock settings via the remote server 225.

In some embodiments, the network may include a voice-activated digital assistant 235 (e.g., Google Home®, Amazon Alexa®, etc.), which may connect to one or more of the network components to change the settings on the lock 210. The voice-activated digital assistant 235 may be configured to receive a voice command such as "change the lock sleep settings to conserve maximum battery power between 10 μm and 6 am every day." Other example commands may include: "set heartbeat interval to 8 hours," "create guest access for Jane Doe using PIN code 1234 on Friday at 2 pm until Sunday at 1 lam," or "create access user named John Doe using PIN Code 2468." In commercial settings, examples may include: "add Jane Doe to door 23," "add access user Jane Doe to Door Group 251," or, "cancel Jane Doe's access to all doors."

In response to such commands, the voice-activated digital assistant 235 may then send an instruction to one or more of the computing device 230, the remote server 225, the WiFi router 220, and/or the local RF protocol radio 215, depending on where the voice-activated digital assistant 235 is in relation to the other network components. It may be in the lock's local environment (LAN) or may be remote, for example. The remote server 225 and/or the lock 210 may comprise an API to accept commands sent from the voice-activated digital assistant 235 to change any setting of the lock 210, including the sleep/wake schedule of the radio(s) of the lock 210. In embodiments wherein the voice-activated digital assistant 235 is within the local environment of the lock 210, it is contemplated that a command to change a setting of the lock may be transmitted directly to the lock via the local WiFi 220, the local RF protocol radio gateway, or directly to the lock 210 itself, for instance if the voice-activated digital assistant 235 is connected to the same local RF radio protocol. Such a direct transmission may allow a local user in a home or office to change settings on a local lock. The change to the settings may be implemented without first sending information about the change to the remote server 225. It is contemplated that the change in settings implemented locally will indeed be transmitted to the remote server 225 at some point in order to allow a remote administrative user to view the changes, but that information may optionally be transmitted to the remote server 225 at a later time, according to the sleep/wake schedule of the lock radios for example.

Figure 3:
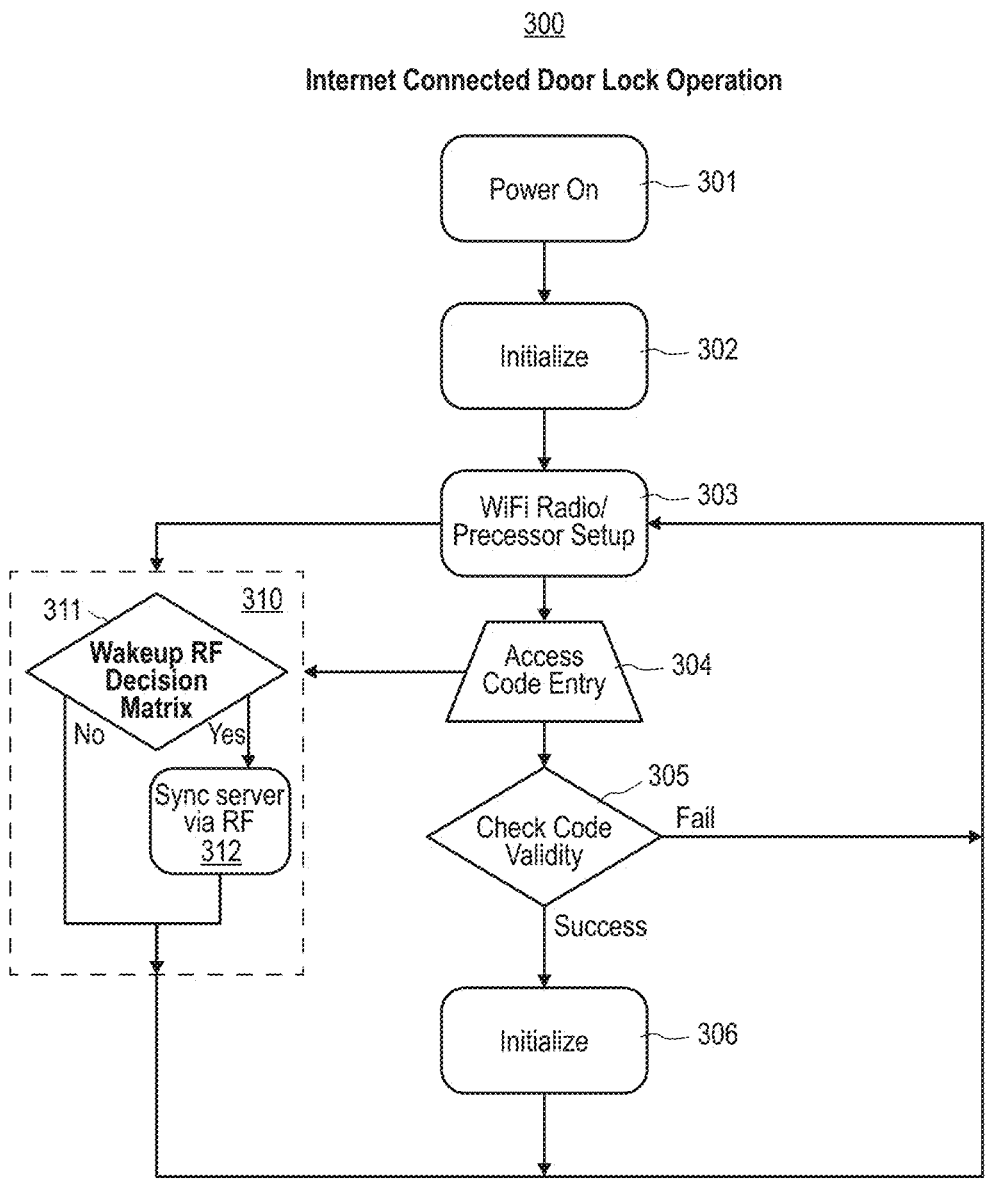
FIG. 3 is a method flowchart depicting steps and one or more algorithms that may be used to perform aspects of the present disclosure.

In addition to user configurability, the disclosure provides other ways in which the sleep/wake schedule of the locks may be altered to maximize battery life and reliability of information transmissions. FIG. 3 is a flowchart showing an overview 300 of the operation of a connected lock of the present disclosure. At block 301, the lock is powered on, and at block 302, the components of the lock are initialized for operation. The initialized components may comprise, for example, the radio(s), associated processor(s), RFID credentialing modules, and any other electrical or electromechanical components. At block 303, the WiFi Radio and/or local RF protocol radio and associated processor(s) may enter a sleep state, which may be a default state until one or more waking events takes place. One event that may wake the radio(s) includes access code entry (or any other type of credentialing for unlocking), shown at block 304. In some embodiments, the entry of an access code may automatically wake the radio, but it is contemplated that in some embodiments, it will not, particularly when no internet connection is required to verify a credential for entry. Though it may be ideal to instantly send information about an entry to the remote server, certain circumstances, such as low battery life, may make it more advantageous to keep the entry information local and only transmit it to the server the next time the radio is scheduled to be awakened.

Other waking events may trigger the waking of one or more of the lock's radios. Block 310 shows a "wake-up decision matrix" block 311 that comprises one or more algorithms for determining whether an event actually results in waking up one or more radios. If an event does not result in the algorithm deciding to wake one or more radios, then the radios will remain asleep as in block 303. If the event does result in algorithm deciding to wake one or more radios, the one or more radios will wake, connect to the remote server via the internet, and transmit stored information at block 312.

Whether the access code entry (or other credentialing for unlocking) results in the one or more radios waking, the lock checks the validity of the code or credential locally, at block 305. If the code or credential is validated, the lock unlocks at block 306. Whether the code validation is successful at unlocking the door or not, the one or more radios may remain asleep as shown in block 303.

Figure 4:
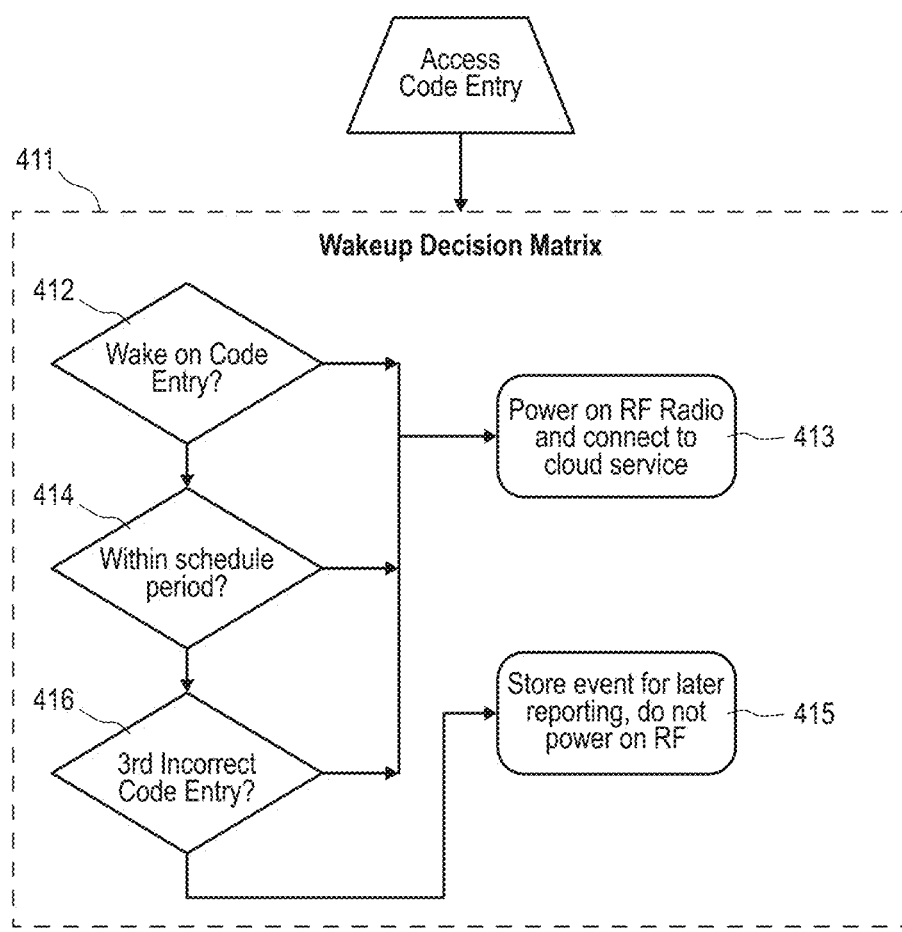
FIG. 4 is a method flowchart depicting an algorithm for determining a sleep or wake state of one or more transceivers in a lock according to an embodiment of the present disclosure.

FIG. 4 shows a more detailed block diagram 400 of the wake-up decision matrix block 311 of FIG. 3. The wake-up decision matrix shown depicts one embodiment of algorithmic decision blocks that may be used to wake one or more radios. In other embodiments, fewer or more decision blocks may be implemented. As shown, at block 412, a decision may be made whether to wake one or more radios automatically upon code entry. If that decision is configured to be "yes," (e.g., if such a setting was configured by a user, or by default), the lock may wake-up the radio(s) and connect to the cloud service at block 413. The decision at block 412, if not automatically "yes" may be dependent on other conditions. For example, the algorithm may require checking, at block 414, if the access code is being entered within a scheduled period for automatic waking. For example, the user-configured or default setting may require that during business hours on weekdays, the radio automatically wakes up upon access code entry. In this example, if the access code is entered during non-business hours, the algorithm may check another condition at block 416. Block 416 depicts a condition wherein if someone has entered a code incorrectly three times in a row, the algorithm wakes up the one or more radios to send that information to the server. Such a condition at block 416 may be implemented to alert a user/administrator to that someone authorized may be having trouble with access, or that someone unauthorized may be tampering with the lock.

If none of the conditions in blocks 412, 414, or 416 are met, resulting in a "yes, wake-up the radio(s)," the radios may remain asleep as shown at block 415.

Though not shown, a number of other algorithmic decision blocks may be implemented according to the disclosure. Examples include whether the battery life is below a particular threshold, whether a threshold number of events has occurred between server communication transmittals, whether other patterns of user behavior have been detected, whether tampering has been detected, temperature, time, date, target battery levels, and any other inputs the lock is capable of detecting. The algorithm(s) can also determine whether to wake-up only one of the available radios under certain conditions, such as just the local RF protocol radio or only the WiFi radio.

Another aspect of the disclosure is that the processor(s) of the lock may include logic to implement self-optimization of radio wake and sleep schedules based on learning from detected inputs. That is, the lock may use artificial intelligence or machine learning logic to increase or decrease the frequency of radio wake-ups, set radio wake-up times for particular time periods or conditions, and otherwise adjust parameters for when and how information is transmitted from the lock to the server. This logic may operate by receiving multiple inputs over time, such as the inputs described with reference to the wake-up decision matrix 411 of FIG. 4. The logic may further operate by detecting patterns of user behavior, and by using all such inputs over time to detect patterns in how the inputs increase or decrease battery life and information transmission reliability. As an example, the processor logic may detect a pattern wherein the lock is used very regularly and frequently between 8 am and 10 pm for five days in a row, and may know (via programming or connection to a day/date internet API) that these five days are weekdays. It may detect that the locks are used significantly less between the hours of 10 pm and 8 am on these same days, and may then automatically adjust the radio wakeup schedules to be more frequent during the 8 am to 10 pm weekday hours. The lock may then detect that the following two days, the locks are used between the hours of 9 am and 1 pm at a frequency that is lower than the weekday 8 am-10 pm frequency, but more than the weekday 10 pm-8 am frequency, and may adjust the radio wakeup schedules to a medium frequency during these times. It is contemplated that each kind of input described herein may be used as a basis for the artificial intelligence logic to automatically adjust radio wake and sleep schedules and information transmissions.

Figure 5:
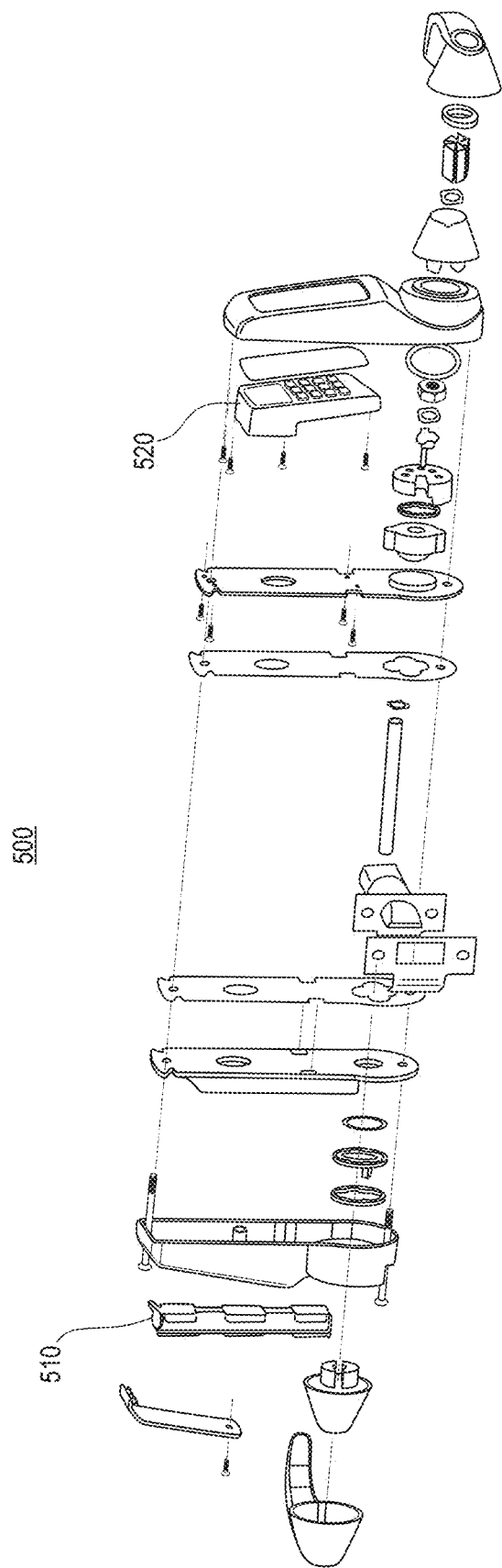
FIG. 5 is an exemplary hardware diagram depicting a lock according to an embodiment of the present disclosure.

FIG. 5 shows an exploded view hardware diagram of a lock 500 according to an embodiment of the present disclosure. As shown, the lock 500 may comprise a keypad 520. The lock may also comprise a reader/controller component 510, which may house one or more processors, batteries, local RF protocol radios, WiFi radios, and/or RFID/BLE credential access modules as depicted in FIG. 1.

Another aspect of the disclosure is that the lock may automatically enter a power-saving mode that overrides a regular wake and sleep schedule when a local RF protocol network and/or WiFi network is down. In locks that connect to the internet via either type of radio, the lock may detect when network connectivity has been lost. In such an event, the lock may override a setting in which the radio(s) automatically wake-up upon the entry of an access code, or in which the radios are normally scheduled to wake-up every hour. In some embodiments, when the lock detects network connectivity failure, the wake-up schedule can automatically adjust such that it the times between new connection attempts dynamically increase. For example, if a lock detects a network outage, the lock may try to connect 5 minutes after the first miss, then again in 25 minutes, then again in 90 min, then in 240 minutes, then in 360 minutes. In embodiments, the lock may try repeatedly at a 360 min interval (for example, 10 times) and then stop trying. At this time, the lock may remain offline until physically woken up or reconnected.

In such example where a new power-saving wake-up schedule overrides an existing regular schedule, this new RF radio wake configuration may be implemented as a result of a binary decision algorithm (i.e., network connectivity or no network connectivity), as in the above example. In other embodiments, a power-saving wake-up schedule may be dynamically implemented based on other inputs (e.g., time of day, date, battery levels, etc.). Sample inputs could include "if it is Thursday, and it is after 5:00 pm, and the battery level is below XX, and the internet went down, then change the wake frequency to YY." Such dynamic variable input may be implemented with a preset combination like the above example or with an AI implementation that allows the lock to optimize battery life through modifying wake cycles on its own as it gathers data about which variables historically contribute the most to battery life extension.

Locks of the present disclosure, and the cloud service associated therewith, may include additional features for automatically adjusting sleep and wake schedules that provide ease-of-use benefits for administrative users. In locks that use any type of RFID or BLE for credentialing access users, or in locks that use any type of radio to connect to the internet, a default power-saving sleep schedule may be implemented automatically when an access user presents a credential that indicates the access user is a temporary or guest user. For example, locks of the present disclosure may often be used for vacation rentals, and the credentials given to vacation renters may have properties indicating that the credential is temporary. The presentation of such a credential itself may cause the lock to automatically enter a "vacation mode" sleep and wake schedule for the radio(s). For example, it may automatically decrease a polling period during which the RFID or BLE transceiver is polling for credentials. It may also increase the sleeping intervals during the weekdays or weekends, for example.

Another automatic ease-of-use feature is the ability to automatically set a type of sleep or wake schedule depending on a use case or business type selection by an administrative user. For example, an administrative user may be able to select that the lock is being used for an office building, a hotel, a home, or a private vacation rental. The administrative user may be able to make such a selection on an interface of the lock (such as a keypad), on a remote computing device (e.g., a PC or smartphone), or via a voice activated digital assistant. Each of these use cases or business types may have different default sleep and wake schedules.

As previously described, some locks of the present disclosure may implement a local algorithm lock, which does not require an internet connection to unlock when a code or credential is presented. In some embodiments, locks may comprise both a local algorithm lock, an RFID or BLE credentialing lock, and/or a keypad for code entry. Such locks may or may not comprise a separate local RF protocol radio or WiFi radio. In those that do comprise a separate local RF protocol radio or WiFi radio, the sleep or wake schedules and algorithms may determine whether the local algorithm lock or if the RFID/BLE lock will be used to open the lock. As an example, if a lock comprised each of algorithm credentialing, WiFi radio, a keypad, and RF credentialing, an administrative user could use the algorithm credentialing function in the following scenario: if the administrative user needs to get a last minute guest (access user) into a vacation rental unit, and the internet at the unit has just gone down, the administrative user can issue an algorithm credential that will work immediately on the lock even though there is no connectivity.

In some embodiments, the radio wake-up schedules may be based on, or changed, in response to access user behavior. For example, in any locks that connect to the internet, locks may have the ability to automatically reconfigure the radio wakeup settings if an access user presents a credential (keypad press, RFID, or BLE) and the credential is denied more than two times. Referring back to FIG. 4, at block 416, such a user action may be part of an algorithm to determine whether the radio wakes up. It is contemplated that even if the current radio wake-up schedule is set to wake-up at a later time, this action can immediately wake-up and connect, and can alter the wake-up schedule until a predetermined time, or until it is reset by an administrative user.

Another aspect of the disclosure is that administrative users can be instantly notified of particular statuses or indicators of a lock via a "lock health notification" system. This system may utilize a web application that is part of the cloud service to implement such notifications. For internet-connected locks, notifications may occur in the form of email, text or push notification. One type of notification may occur if the data on a lock is not in sync with the data on a web application (at the cloud service) or on an administrative user's mobile application. For example, if an administrative user sets an access pin code for a guest access user via the web or mobile application, and gives the guest access user the access pin code for a keypad lock, and if it does not work properly for the guest access user to open the lock during the specified time frame, (as set in a web or mobile application) the lock will notify the administrative user that the data on the lock is not in sync with the data in a web or mobile application. It is contemplated that a failed PIN code entry would result in a heartbeat transmission automatically initiated by the pressing of a key, and that any pending access code changes from the server would be transmitted back to the lock to resolve the failed PIN attempt. However, this notification feature may allow the administrative user to immediately troubleshoot any connection problems between the lock and the server, for example. It could also notify the administrative user of any defect with the lock itself: for example, if it is able to communicate but is not able to store code data on the lock's memory. A number of other types of notifications about the health of the lock may be sent via notification. For example, an administrator may wish to be notified any time a lock is within 10 hours of needing to have its battery replaced, an administrative user may be able to define these notification settings through any user interface such as a PC browser, mobile device or voice-activated digital assistant.

Yet another feature allows an administrative user to utilize the technology built into the lock to provision the lock onto a LAN. Provisioning of a smart device onto a LAN typically requires entering an SSID and passphrase associated with a WiFi router in the LAN environment. While many computing devices such as smartphones and tablets have full alphanumeric keypads for entering an SSID and passphrase, many locks of the present disclosure will not. Instead, an RFID smartcard may be used to configure the SSID settings and passphrase. For example, in locks that use RFID or BLE to credential access users and connect to the internet, an administrative user may present at the lock a smart card that is preconfigured with a local network's SSID and passphrase such that the act of simply presenting this smart card to the lock will automatically provision the lock onto the local network.

Another aspect of the disclosure provides a Progressive Radio Wake-up (PRW) feature when an internet connection is missed, lost, or unavailable. It is contemplated that for various reasons, internet connections may be interrupted. The one or more radios of a lock may be set to a particular wake-up schedule via the methods described throughout the disclosure, but if the lock is unable to connect during its scheduled waking times, the lock may automatically alter the radio wake-up frequency to a faster frequency in order to connect as soon as possible to make up for the missed connection. The increase in wake up frequency can be set to a steady, but faster frequency, or to a frequency that gets progressively faster with each additional missed connection. Such a progressive radio wake-up feature may only be implemented during previously-indicated peak times in embodiments, when frequent transmissions are critical, because such a feature could quickly reduce battery life during a long network outage. As described earlier in the disclosure, a corresponding battery-saving feature provides that during network outages, the sleep duration between heartbeat transmissions progressively increases in time. The options to either progressively increase or decrease the sleep duration may be optimized based on requirements for battery saving and ensuring transmission. Such options may be hard coded into the lock's firmware or can be user configurable and defined by an administrative user through any user interface on a PC, mobile device or voice-activated digital assistant.

As previously described, a web application (i.e., a Software-as-a-service ("SaaS") application), mobile application or other cloud platform may be utilized to implement one or more aspects of the present disclosure. The various applications may be used to control, monitor, and/or adjust any of attributes of locks or networks of locks discussed throughout the disclosure. It is contemplated that one or more third party applications may be used to remotely control, monitor, and or adjust attributes of the locks via one or more APis. FIG. 6 shows an exemplary user interface 600 through which an administrative user may view and configure aspects of a particular lock. As shown, among the configurable features are a name 601, a programming code 602, a "Wake Wi Fi" initiation action 603, a mute feature 604, a heartbeat interval time setting 605, an auto-lock activation feature 606, and a lock action schedule (i.e., a wake-up schedule) selection feature 607. As shown, the "Wake Wi-Fi," 603, heartbeat interval 605, and lock action schedule 607 each have drop down menus indicated by arrows 613, 615, and 617, respectively. The "Wake Wi-Fi" initiation action in this particular example is to wake "on any user action, e.g., keypress," which is one setting that optimizes the reliability of transmissions to and from the lock at important times even if other lock settings are highly optimized for preserving battery life (e.g., long sleep periods). Additional configurability options for various features described in this disclosure may be available in embodiments of the user interface 600.

Figure 7:
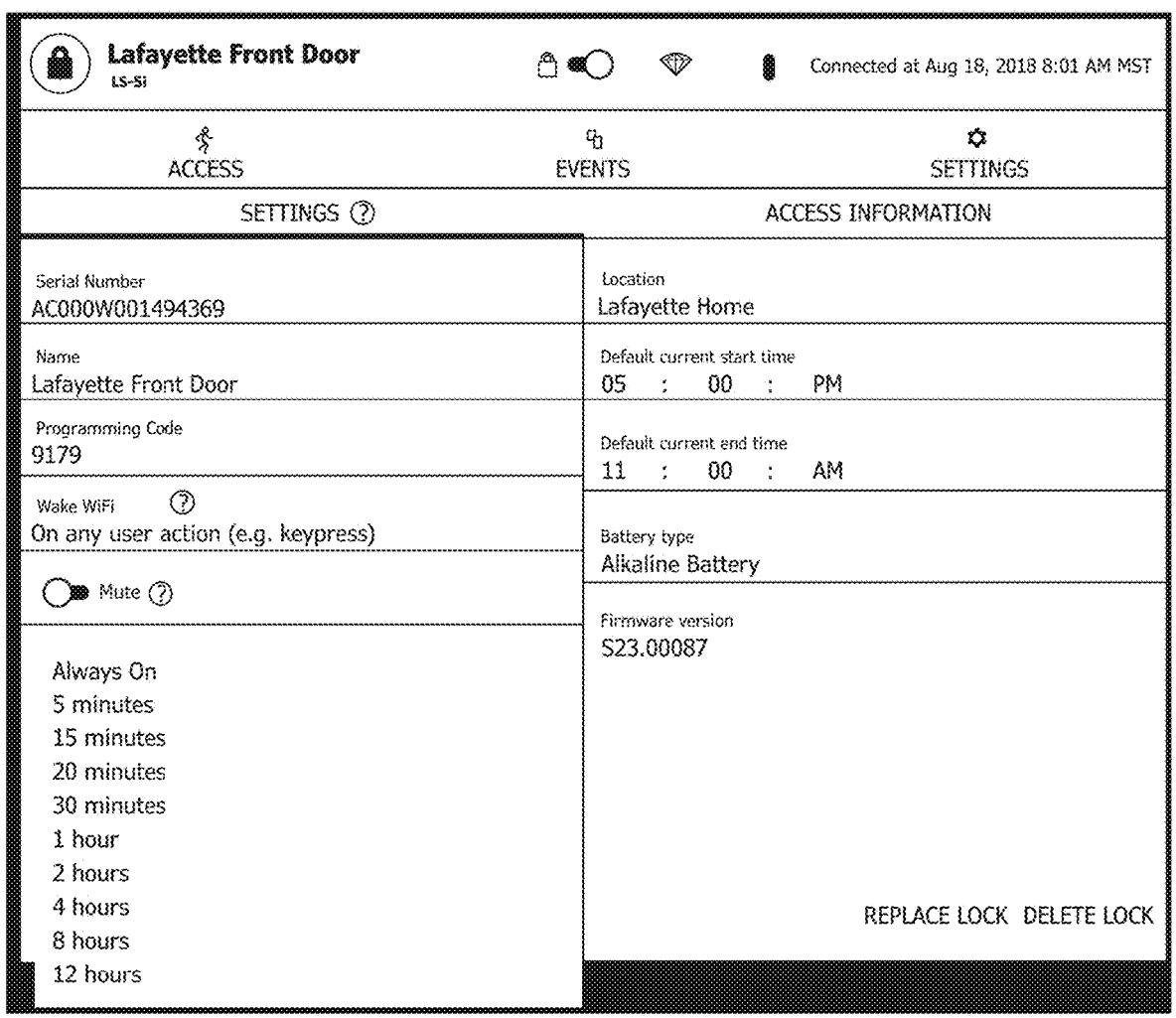
FIG. 7 is exemplary graphical user interface through which an administrative user may configure particular settings, including a duration of time between transceiver waking, of a lock according to the present disclosure.

FIG. 7 shows a drop-down menu 715 of the heartbeat interval 605 shown in FIG. 6. As shown, an administrative user may select varying lengths of time for sleep durations between heartbeat intervals. In the embodiment show, the heartbeat can be selected as "always on," or can be selected to be sent in intervals ranging from 5 minutes to 12 hours. As described previously in this disclosure, longer sleep durations may be implemented to conserve battery life.

Figure 8:
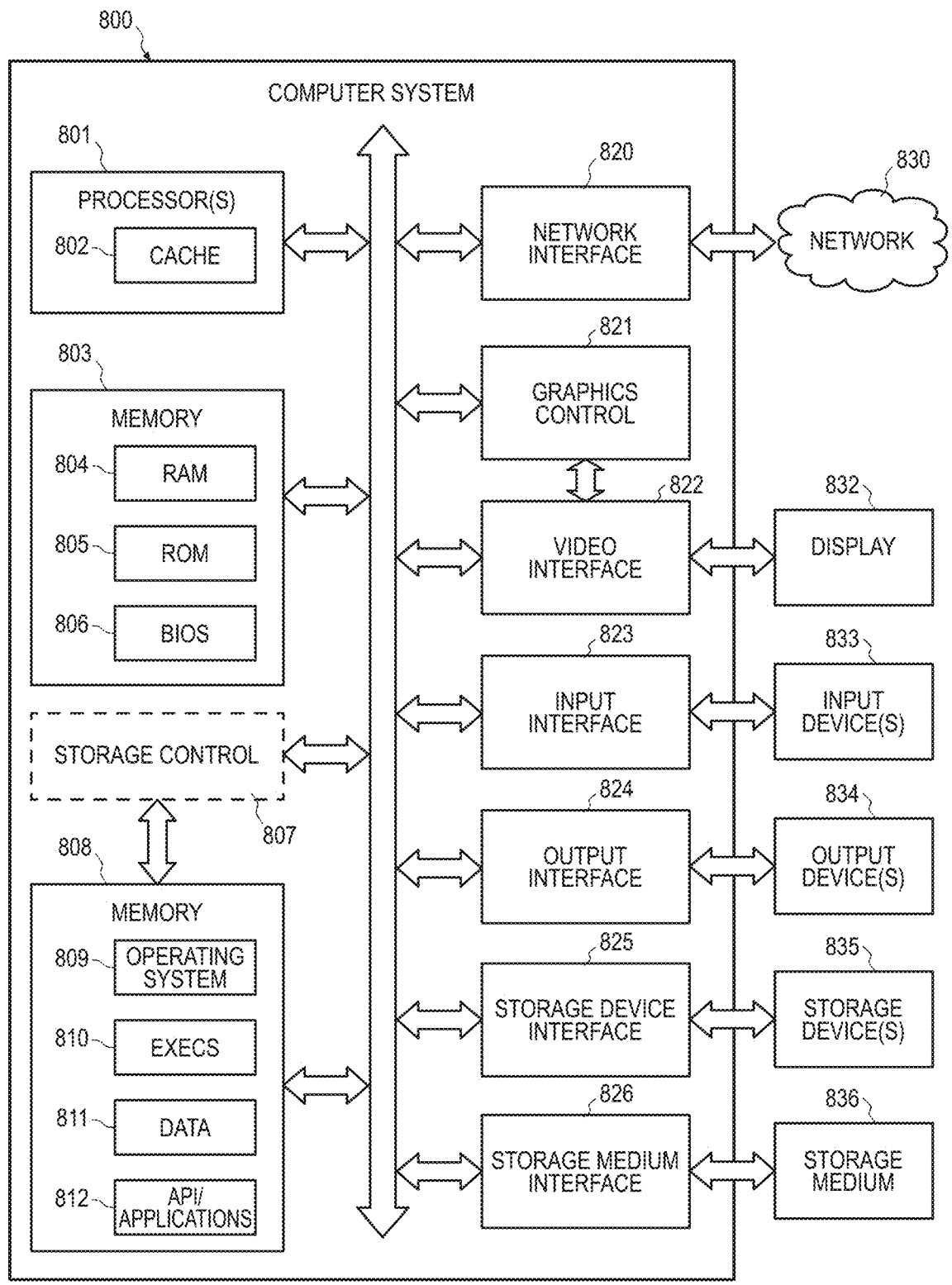
FIG. 8 is a logical block diagram of a computer that may be used to implement aspects of the present disclosure.

Referring next to FIG. 8, it is a block diagram depicting an exemplary machine that includes a computer system 800 within which a set of instructions can execute for causing a device to perform or execute any one or more of the aspects and/or methodologies of the present disclosure. The components in FIG. 8 are examples only and do not limit the scope of use or functionality of any hardware, software, embedded logic component, or a combination of two or more such components implementing particular embodiments.

Computer system 800 may include a processor 801, a memory 803, and a storage 808 that communicate with each other, and with other components, via a bus 840. The bus 840 may also link a display 832, one or more input devices 833 (which may, for example, include a keypad, a keyboard, a mouse, a stylus, etc.), one or more output devices 834, one or more storage devices 835, and various tangible storage media 836. All of these elements may interface directly or via one or more interfaces or adaptors to the bus 840. For instance, the various tangible storage media 836 can interface with the bus 840 via storage medium interface 826. Computer system 800 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 801 (or central processing unit(s) (CPU(s))) optionally contains a cache memory unit 802 for temporary local storage of instructions, data, or computer addresses. Processor(s) 801 are configured to assist in execution of computer readable instructions. Computer system 800 may provide functionality for the components depicted in FIG. 1 as a result of the processor(s) 801 executing non-transitory, processor-executable instructions embodied in one or more tangible computer-readable storage media, such as memory 803, storage 808, storage devices 835, and/or storage medium 836. The computer readable media may store software that implements particular embodiments, and processor(s) 801 may execute the software. Memory 803 may read the software from one or more other computer-readable media (such as mass storage device(s) 835, 836) or from one or more other sources through a suitable interface, such as network interface 820. The software may cause processor(s) 801 to carry out one or more processes or one or more steps of one or more processes described or illustrated herein. Carrying out such processes or steps may include defining data structures stored in memory 803 and modifying the data structures as directed by the software.

The memory 803 may include various components (e.g., machine readable media) including, but not limited to, a random access memory component (e.g., RAM 804) (e.g., a static RAM "SRAM", a dynamic RAM "DRAM, etc.), a read-only component (e.g., ROM 805), and any combinations thereof. ROM 805 may act to communicate data and instructions unidirectionally to processor(s) 801, and RAM 804 may act to communicate data and instructions bidirectionally with processor(s) 801. ROM 805 and RAM 804 may include any suitable tangible computer-readable media described below. In one example, a basic input/output system 806 (BIOS), including basic routines that help to transfer information between elements within computer system 800, such as during start-up, may be stored in the memory 803.

Fixed storage 808 is connected bidirectionally to processor(s) 801, optionally through storage control unit 807. Fixed storage 808 provides additional data storage capacity and may also include any suitable tangible computer-readable media described herein. Storage 808 may be used to store operating system 809, EXECs 810 (executables), data 811, API applications 812 (application programs), and the like. Often, although not always, storage 808 is a secondary storage medium (such as a hard disk) that is slower than primary storage (e.g., memory 803). Storage 808 can also include an optical disk drive, a solid-state memory device (e.g., flash-based systems), or a combination of any of the above. Information in storage 808 may, in appropriate cases, be incorporated as virtual memory in memory 803.

In one example, storage device(s) 835 may be removably interfaced with computer system 800 (e.g., via an external port connector (not shown)) via a storage device interface 825. Particularly, storage device(s) 835 and an associated machine-readable medium may provide nonvolatile and/or volatile storage of machine-readable instructions, data structures, program modules, and/or other data for the computer system 800. In one example, software may reside, completely or partially, within a machine-readable medium on storage device(s) 835. In another example, software may reside, completely or partially, within processor(s) 801.

Bus 840 connects a wide variety of subsystems. Herein, reference to a bus may encompass one or more digital signal lines serving a common function, where appropriate. Bus 840 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 800 may also include an input device 833. In one example, a user of computer system 800 may enter commands and/or other information into computer system 800 via input device(s) 833. Examples of an input device(s) 833 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 833 may be interfaced to bus 840 via any of a variety of input interfaces 823 (e.g., input interface 823) including, but not limited to, serial, parallel, game port, USB, FIREWIRE, THUNDERBOLT, or any combination of the above.

In particular embodiments, when computer system 800 is connected to network 830, computer system 800 may communicate with other devices, specifically mobile devices and enterprise systems, connected to network 830. Communications to and from computer system 800 may be sent through network interface 820. For example, network interface 820 may receive incoming communications (such as requests or responses from other devices) in the form of one or more packets (such as Internet Protocol (IP) packets) from network 830, and computer system 800 may store the incoming communications in memory 803 for processing. Computer system 800 may similarly store outgoing communications (such as requests or responses to other devices) in the form of one or more packets in memory 803 and communicated to network 830 from network interface 820. Processor(s) 801 may access these communication packets stored in memory 803 for processing.

Examples of the network interface 820 include, but are not limited to, a network interface card, a modem, and any combination thereof. Examples of a network 830 or network segment 830 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 830, may employ a wired and/or a wireless mode of communication. In general, any network topology may be used.

Information and data can be displayed through a display 832. Examples of a display 832 include, but are not limited to, a liquid crystal display (LCD), an organic liquid crystal display (OLED), a cathode ray tube (CRT), a plasma display, and any combinations thereof. The display 832 can interface to the processor(s) 801, memory 803, and fixed storage 808, as well as other devices, such as input device(s) 833, via the bus 840. The display 832 is linked to the bus 840 via a video interface 822, and transport of data between the display 832 and the bus 840 can be controlled via the graphics control 821.

In addition to a display 832, computer system 800 may include one or more other peripheral output devices 834 including, but not limited to, an audio speaker, a printer, and any combinations thereof. Such peripheral output devices may be connected to the bus 840 via an output interface 824. Examples of an output interface 824 include, but are not limited to, a serial port, a parallel connection, a USB port, a FIREWIRE port, a THUNDERBOLT port, and any combinations thereof.

In addition, or as an alternative, computer system 800 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for operating an access control device, the method comprising:
    determining, for a wireless transceiver of the access control device, a wake-up schedule that controls a frequency at which the wireless transceiver wakes up from a sleep mode to perform wireless communications;
    determining, via a machine learning algorithm implemented by a processor of the access control device, an access attempt pattern for the access control device based at least in part on a series of access attempts detected by the access control device; and
    updating the wake-up schedule for the wireless transceiver based at least in part on the access attempt pattern, wherein updating the wake-up schedule comprises updating the frequency at which the wireless transceiver wakes up to perform wireless communications.

2. The method of claim 1, wherein the access attempt pattern is determined over a period of time, the method further comprising:
    determining, via the machine learning algorithm, an initial access attempt pattern over an initial period of time that is different from the period of time, wherein the wake-up schedule is determined based at least in part on the initial access attempt pattern.

3. The method of claim 1, further comprising:
    determining, via the machine learning algorithm, an impact of the access attempt pattern on power consumption of the access control device, wherein the wake-up schedule is updated based at least in part on the impact.

4. The method of claim 1, further comprising:
    determining, via the machine learning algorithm, a connectivity pattern associated with wirelessly connecting to a wireless network device, wherein the wake-up schedule is updated based at least in part on the connectivity pattern.

5. The method of claim 1, further comprising:
    determining, via the machine learning algorithm based at least in part on the access attempt pattern, a trigger condition for waking up the wireless transceiver outside of the wake-up schedule.

6. The method of claim 1, further comprising:
    determining, via the machine learning algorithm based at least in part on the access attempt pattern, a trigger condition for switching from the wake-up schedule to a different wake-up schedule.

7. The method of claim 1, further comprising:
    determining, via the machine learning algorithm based at least in part on historical connectivity data associated with wirelessly connecting to a wireless network device, a transmission power for use by the wireless transceiver.

8. The method of claim 1, further comprising:
    updating, based at least in part on the access attempt pattern, a second wake-up schedule for a second wireless transceiver that operates according to a different wireless protocol than the wireless transceiver.

9. The method of claim 8, wherein the wireless transceiver operates according to a first wireless protocol and the second wireless transceiver operates according to a second wireless protocol, the method further comprising:
    selecting, via the machine learning algorithm based at least in part on the access attempt pattern and the first wireless communication protocol and the second wireless communication protocol, one of the wireless transceiver and the second wireless transceiver for transmitting information classified as high priority.

10. The method of claim 1, further comprising:
    updating, via the machine learning algorithm, a second wake-up schedule for the wireless transceiver based at least in part on the access attempt pattern.

* * * * *